April 11, 1950  D. SILVERMAN ET AL  2,503,422
CORRECTING PENDULUM GRADE-ANGLE MEASUREMENT
Filed July 26, 1947  4 Sheets-Sheet 1

Daniel Silverman
Joseph D. Eisler
Julian F. Evans
INVENTORS

BY Newell Pottoff
ATTORNEY

April 11, 1950        D. SILVERMAN ET AL        2,503,422
CORRECTING PENDULUM GRADE-ANGLE MEASUREMENT Filed July 26, 1947        4 Sheets-Sheet 2

Daniel Silverman
Joseph D. Eisler
Julian F. Evans
INVENTORS

BY *Newell Potter*

ATTORNEY

Patented Apr. 11, 1950

2,503,422

UNITED STATES PATENT OFFICE 2,503,422

CORRECTING PENDULUM GRADE-ANGLE MEASUREMENT

Daniel Silverman, Joseph D. Eisler, and Julian F. Evans, Tulsa, Okla., assignors to Stanolind Oil and Gas Company, Tulsa, Okla., a corporation of Delaware Application July 26, 1947, Serial No. 763,863

5 Claims. (Cl. 33—215)

1

This invention relates to the art of topographic surveying and is directed particularly to an elevation-surveying instrument of the gravity-pendulum type, which continuously indicates the elevations along a transverse over which it is transported by a vehicle. Specifically, the invention comprises a method and means of very accurately and continuously forming the summation or integral of distance increments traveled along a path times the sine of the grade angle associated with each increment. Changes in the value of this summation or integral are directly proportional to the changes in elevation along the path.

In elevation meters of this type, which employ a pendulum as a reference for the continuous measurement of the grade angle and means for introducing the sine of this angle into the integral-computing mechanism, notable improvements in accuracy have been achieved by suspending the pendulum between horizontal torsion fibers and by observing its motion relative to the vehicle with a follower mechanism that is non-reactive, imposing no load whatever on the pendulum. The torsion-fiber suspension appears to introduce even less friction than the most delicate jeweled pivots or anti-friction bearings, while friction in the follower system has no effect on the pendulum position because of the complete absence of reaction of the follower on the pendulum. An example of an elevation meter embodying these features is shown by Figure 3 of United States Patent 2,362,616 to R. T. Cloud.

While inaccuracy due to frictional effects has been largely eliminated by these two expedients, both of them, however, introduce certain additional complications. In its preferred form the follower mechanism includes a light source, a mirror mounted on and rotated by the pendulum, and a fixed photocell unit. The light source is mounted on a follower arm which pivots concentrically with the pendulum torsion fibers, which arm is driven by a motor so controlled from the photocell output as to keep the light beam reflected from the pendulum mirror directed toward the photocell unit. In an optical system of this type, when the pendulum and mirror rotate through a given angle, the lamp-carrying follower arm rotates through twice this angle in order to keep the light beam directed toward the fixed photocell unit. It is from this double-angle motion of the follower arm, or some component of it, that the sine of the angle between the road and the horizontal is to be derived. This would cause no difficulty if the sine of an angle and the sine of the angle doubled

2 were proportional to each other. However, the range of angles where this is true, at least with the precision ordinarily desired for accurate surveying, is extremely limited. Only from 0° to about 2° or 3° may the sine of the double angle be substituted for the sine of the angle using .50 as the proportionality constant; above about 3° this angle-doubling error is appreciable. In fact at 10° or 15° it is quite large and increases rapidly at larger angles.

The second complication, arising from the torsion of the pendulum suspending fibers, in a sense adds to the difficulty of correcting for the error from angle-doubling, although both effects operate independently. Due to the torque exerted by the torsion fibers on the pendulum the angle assumed by the latter with reference to its support is always less than the angle between the road and the horizontal. In other words, the angle which is doubled by the follower arm is not the true road angle, but is something smaller than it. The error due to fiber torsion can be kept fairly small by employing relatively weak fibers which exert only a small restoring force on the deflected pendulum. Further, the range of angles where the sine of a double angle may be substituted for the sine of the angle can be extended slightly by using a proportionality constant greater than .50. This introduces some error as small grade angles, but there are many fairly level areas which may be satisfactorily surveyed with an instrument embodying such compromises. For very accurate surveying and particularly for the surveying of rough terrain, however, some additional means of correcting for errors from these two sources is clearly necessary.

It is accordingly a primary object of this invention to provide, in an elevation-measuring instrument of the type employing a torsionally suspended pendulum and an angle-doubling follower system, an integral-computing mechanism of greatly improved accuracy. Another object of the invention is to extend the range of angles to which such an instrument is accurately responsive so that surveys may be accurately carried out over rough terrain. A further object of the invention is to provide means for improving the accuracy of integral computation: specifically, means for very accurately taking the sine of the grade angle which are simple to manufacture and apply and do not greatly complicate the construction of the instrument. A still further object of this invention is to provide, for an elevation meter of this type, an integral-computation mechanism which is accurate both at small and at quite large angles of grade. Other objects, uses, and advantages of the invention will become apparent as this description proceeds.

Briefly, the essence of our invention by which the foregoing and other objects are accomplished comprises inserting, as a connection between the lamp or follower arm and the integrating mechanism, a correcting linkage which changes the relation between the follower-arm motion and the integrator motion as a function of the road angle. In other words, instead of adjusting the integrating mechanism directly from the follower-arm movement, for example, by a coupling which provides an adjustment motion proportional to the sine of the follower arm angle, a linkage member is inserted which changes the integrator adjusting movement as a function of the path angle by just enough to accomplish the desired correction. This linkage member operates to increase as a function of the grade angle the factor of proportionality between the integrator adjusting member displacement and the sine of the follower arm rotation angle so that these displacements are no longer those produced by a conventional sine-bar mechanism, but become quite closely proportional to the sine of the true grade angle over a fairly wide range. In the preferred embodiment this linkage member comprises an auxiliary arm pivoted at a point displaced from the axis of the pendulum, but which arm is coupled to the follower arm and bears against plane surfaces in adjusting the integrating mechanism.

The principles and operation of our invention will be better understood by reference to the accompanying drawings forming a part of this application and wherein the same reference numerals are applied to the same or a corresponding part in the different figures. In these drawings.

Figures 1, 3:
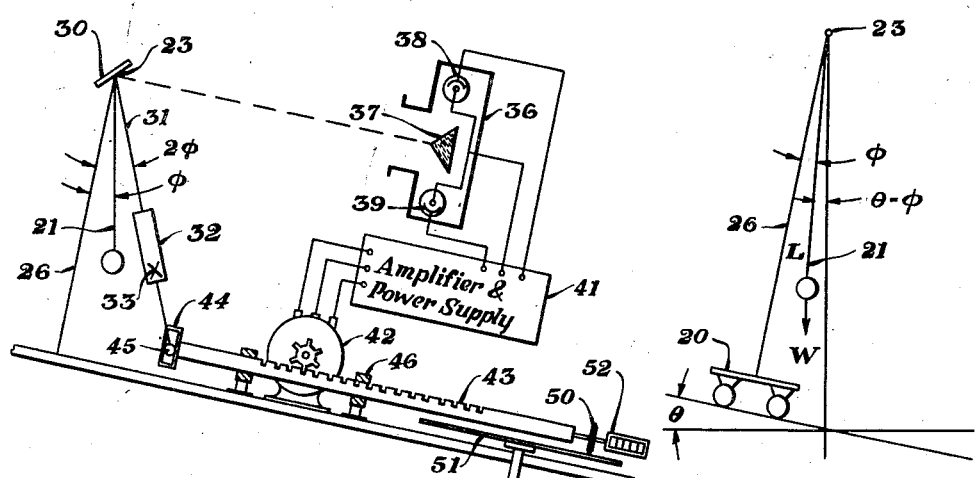
Figure 1 is a diagrammatic representation of a torsionally suspended pendulum mounted on a vehicle for transportation along a traverse.
Figure 3 is a view in elevation, partially diagrammatic, of a photoelectric follower system and integrating means representative of the prior art.
Figure 2:
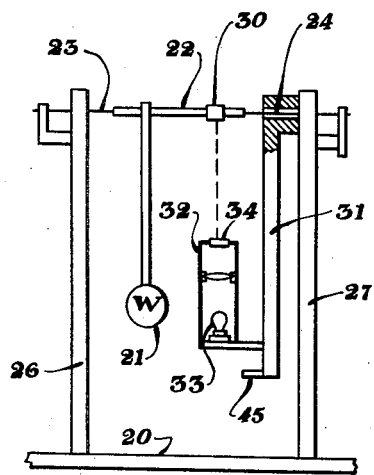
Figure 2 is a view in elevation of a torsion-fiber-suspended pendulum and follower-arm mounting of the type to which our invention is applicable.

Referring now to the drawings, Figures 1 and 2 show the essential details of a torsion-fiber pendulum suspension to which our invention is applicable. A supporting vehicle 20 carries a gravity-responsive pendulum 21 along a traverse inclined, for example, at an angle $\theta$. Vehicle 20 accordingly orients itself at the same angle $\theta$ with respect to the horizontal, while pendulum 21 tends to remain vertical under the acceleration of gravity. Pendulum 21, of effective length L and weight W, is mounted on a horizontal spindle 22 between a pair of torsion fibers 23 and 24 which form a horizontal axis of rotation for the pendulum perpendicular to the direction of travel of supporting vehicle 20. The ends of these fibers are fixed to upright supports 26 and 27 mounted on the vehicle. As is shown in Figure 1, due to the torque of fibers 23 and 24 pendulum 21 hangs at an angle $\phi$ with respect to its support 26 which is less than the grade angle $\theta$. Letting T represent the fiber torsion coefficient, which may be defined as the torque to produce a unit angular twist of the fibers, an expression for $\theta$ as a function of $\phi$ can be determined readily from the torque equation $$WL \sin (\theta - \phi) = T\phi \qquad (1)$$

obtaining $$\theta = \phi + \sin^{-1} \frac{T}{WL}\phi \qquad (2)$$

On the other hand, as no such simple expression for $\phi$ as a function of $\theta$ exists, in order to study the relation of these angles under various conditions, it is necessary to assume values of $\phi$ and work backwards to determine the corresponding values of $\theta$.

The non-reactive system for following the motion of pendulum 21 and obtaining from it a sine function is shown in Figures 2 and 3. On the pendulum spindle 22 is fixed a small mirror 30 which therefore rotates with the pendulum. A follower arm 31, pivoted to support 27 concentrically with fiber 24, carries a housing 32 in which are a light source 33 and a focusing or condensing lens 34. The light beam from source 33 is reflected by mirror 30 to a fixed housing 36 containing a beam-splitting silvered prism 37 which divides the light between and directs it to photocells 38 and 39. An amplifier and power supply unit 41, which may be of any suitable conventional type, responsive to the output of these photocells controls the operation of a reversible motor 42, which moves an integrator-adjusting member in the form of a rack 43 having a vertical slot 44 in which slides a horizontal pin 45 on follower arm 31. Suitable guides 46 constrain rack 43 to linear displacements in a direction perpendicular to the follower-arm position for zero grade angle.

In operation, as pendulum 21 rotates mirror 30 and shifts the light beam so that the photocells are unequally illuminated, motor 42 is energized to shift rack 43 and move follower arm 31 in a direction to center the light beam again on prism 37. As the pendulum angle relative to the support is the angle $\phi$, it is clear that the follower-arm angle is 2$\phi$. Since the effect of the cooperation of the slot 44 and the pin 45 is to derive from the follower arm only that component of its motion perpendicular to the arm position for zero grade angle, the motion of rack 43 is therefore proportional to sin 2$\phi$.

The actual computation of the summation or integral of each distance increment traveled times the sine of the corresponding grade angle is performed by a friction wheel 50 on rack 43, the edge of the wheel 50 being in contact with a flat disk 51 rotated according to the distance traveled by a suitable connection to one of the wheels of vehicle 20. A counter or indicator 52 is thus driven by friction wheel 50 proportional to sin 2φ times the distance traveled, its total reading representing the desired integral or summation.

Figure 12:
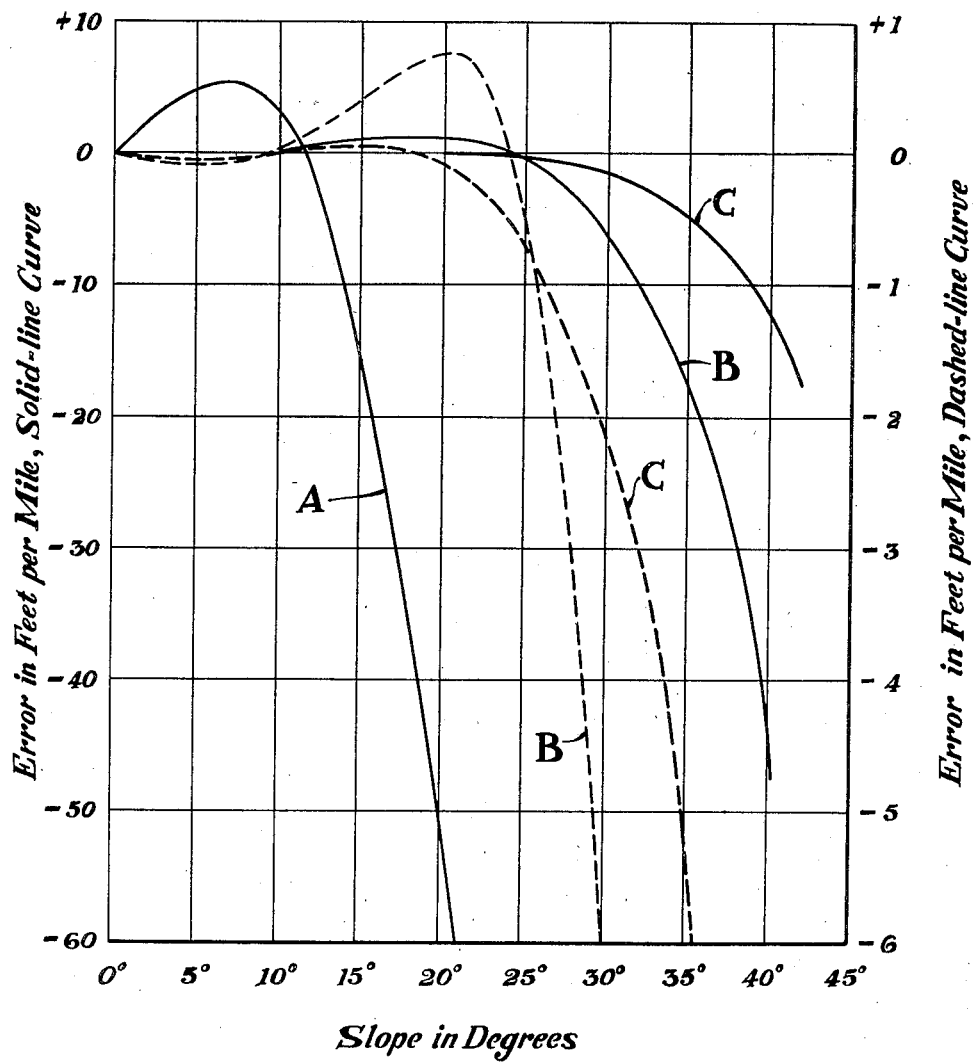
Figure 12 is a graphic illustration of the errors for various degrees of slope under different conditions of correction provided by our invention.

In an elevation meter constructed according to this design it was found by actual measurement that the relation between the road angle θ and the pendulum angle φ could be expressed by the equation $$\theta = \phi + \sin^{-1} .00244\phi \quad (3)$$

where θ and φ were measured in degrees. Assuming a proportionality constant to make the desired sin θ and the actual sin 2φ provided by the instrument exactly equal at $\phi=10°$ ($\theta=11.4°$), the error in feet of elevation per mile of traverse due to integrating with sin 2φ instead of sin θ has been computed for a range of grade angles possible in rough terrain. Curve A of Figure 12 shows how this error varies with the grade angle for slopes from 0° up to about 20°, where it exceeds a value of 50 feet per mile. At angles greater than 20° the slope of this curve is even greater than for the illustrated portion. This error at small angles is highly undesirable, while at large angles it is clearly too great to be tolerated.

Figure 4:
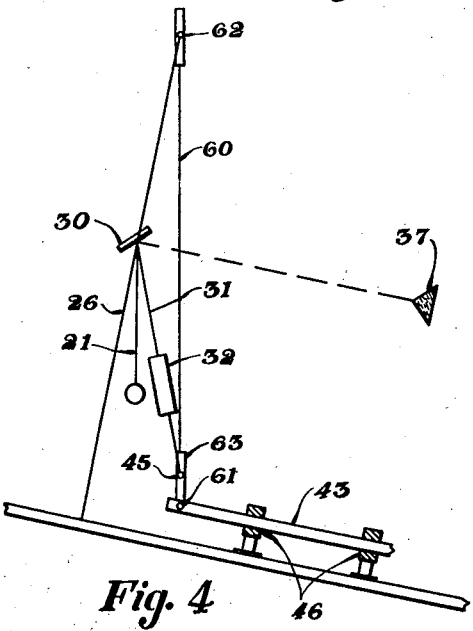
Figure 4 is an elevation, partially diagrammatic, of an auxiliary-arm type of correction mechanism constituting one embodiment of our invention.

One embodiment of our invention is shown in Figure 4 where, in place of the vertical slot 44 and pin 45, the linkage between the integrator-adjusting rack 43 and the follower arm 31 includes an auxiliary arm 60 pivoted at one end by the pin 61 to the rack 43 and slidably pivoting at the other end about a point 62 located on the opposite side of the axis of rotation of pendulum 21 from the follower arm 31 in the direction defined by the arm position for zero grade angle. The pin 45 of the follower arm slides in a slot 63 of auxiliary arm 60 and coincides with pivot 61 to rack 43 when φ and θ are zero. This coupling arrangement interchanges the linear motion of rack 43 and the rotation of follower arm 31 in a manner similar to slot 44 and pin 45; but the correlation is such that the linear motion is no longer proportional to the sine of the arm angle with a constant factor of proportionality. Instead the proportionality factor is a varying one, increasing as a function of the grade angle to make up for the linear displacement being too small at the larger grade angles.

Figure 5:
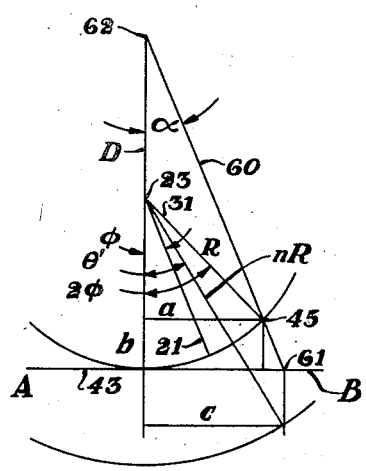
Figure 5 is a diagrammatic representation of the embodiment of Figure 4 illustrating the geometry involved.

The geometry of this arrangement can be visualized better in Figure 5. The pivot 61 being constrained by the guides 46 to move along the straight line AB, the following equations can be written from inspection of this figure:

$$a = R \sin 2\phi \quad (4)$$

$$b = R - R \cos 2\phi \quad (5)$$

$$\tan \alpha = \frac{c-a}{b} = \frac{c}{R+D} \quad (6)$$

Substituting in Equation 6 the values of $a$ and $b$ in Equations 4 and 5:

$$c - R \sin 2\phi = \frac{c(R - R \cos 2\phi)}{R+D} \quad (7)$$

Solving (7) for $c$, the corrected motion of the rack 43 brought about by this linkage, $$c = \frac{R \sin 2\phi (R+D)}{R \cos 2\phi + D} \quad (8)$$

Assuming now that this motion corresponds to the sine of a virtual grade angle θ', so that $$\sin \theta' = \frac{c}{nR}$$

or $$c = nR \sin \theta' \quad (9)$$

We substitute for $c$ in Equation 8 obtaining $$\sin \theta' = \frac{1}{n} \frac{\sin 2\phi (1 + D/R)}{\cos 2\phi + D/R} \quad (10)$$

$n$ being the ratio of the length of the virtual pendulum sweeping out the virtual grade angle θ' to the length of follower arm 31, as shown in Figure 5.

It now remains to be determined whether values for $n$ and $D/R$ in Equation 10 can be found which can make sin θ' vary with φ in the same way that sin θ varies with it. It will be assumed that the ratio T/WL has been determined for the system. This fixes the relation between θ and φ so that θ and sin θ can be ascertained for any value of φ. We may take as an example the particular suspension of the instrument described in Equation 3 having a value of $$T/WL = .00244$$

so that $$\theta = \phi + \sin^{-1} .00244\phi \quad (3)$$

The procedure for determining suitable values for $n$ and $D/R$ then consists in arbitrarily choosing two values for φ in the range of angles to be surveyed, ascertaining the corresponding values of θ and sin θ from Equation 3, and then assuming that sin θ' = sin θ for these two values of φ. The justification for this assumption comes from ascertaining subsequently how closely the values of sin θ' equal the desired values of sin θ for other than the chosen values of φ within the desired range of angles. This assumption gives two sets of values for φ as follows:

| $\phi = 10°$ | $\phi = 20.5°$ |
|---|---|
| sin 2φ = .34202 | sin 2φ = .65606 |
| cos 2φ = .93969 | cos 2φ = .75471 |
| sin θ' = sin θ = .19766 | sin θ' = sin θ = .39667 |

Substitution of these two sets of values in Equation 10 produces two simultaneous equations in which $n$ and $D/R$ are the independent variables. The solution of these equations for these two variables gives the values $n = 1.755$ and $D/R = 3.2477$.

An idea of the correction provided by this mechanism can be obtained from curve B of Figure 12, which shows for a considerable range of grade angles the elevation error in feet per mile. This represents the difference between the true elevations computed from sin θ and the virtual elevations computed from sin θ' by Equation 10. It is to be noted particularly that the dashed-line plot of curve B is plotted to the ten-times vertically expanded ordinate scale on the right of the diagram. As it is the solid-line plot of curve B to the left-hand ordinate scale which is directly comparable with curve A, the improvement over curve A where the elevations are computed using sin 2φ is believed clearly apparent. Below about 15° this error is too small to be shown satisfactorily to the left-hand scale. It is particularly at these small and intermediate angles that accuracy is most important.

The manner of computing D/R and n for a pendulum system having a value of T/WL different from .00244 is believed clear in view of this example. The measured appropriate value of T/WL is inserted in Equation 3, two arbitrary values for φ are chosen, and the corresponding values of θ and sin θ are determined. The proper values of sin 2φ, cos 2φ and sin θ'=sin θ for the two values of φ are substituted in Equation 10, giving two new simultaneous equations in which n and D/R are the variables. Solving for these variables gives the values for them which are appropriate for correction of the mechanism having this specific value of T/WL. If greater accuracy is desired over a smaller range of angles, this can be attained by solving Equation 10 for D/R and n using values of φ, where the correction is assumed exact, smaller and closer together than the chosen 10° and 20.5°, for example, φ=8° and 15°.

Figure 6:
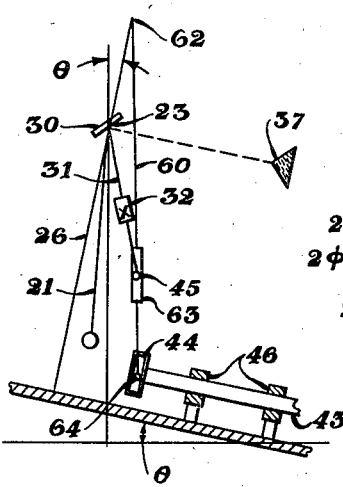
Figure 6 is a view in elevation, largely diagrammatic, of an alternative embodiment of an auxiliary-arm correction mechanism.

Another embodiment of a linkage mechanism employing an auxiliary arm and providing a somewhat better correction over a larger angular range than the mechanism just described is shown in Figure 6. In this embodiment the auxiliary arm 60 is attached to and pivots around the fixed pivot 62 located on the opposite side of the suspension fiber 23 from arm 31, in the direction defined by arm 31 position for zero grade angle. Sliding connections are provided to the follower arm 31 and to the rack 43. Thus, the coupling between auxiliary arm 60 and follower arm 31 includes the horizontal follower-arm pin 45 sliding in a longitudinal slot 63. Coupling of arm 60 to rack 43 is by means of a horizontal pin 64 on the end of arm 60, which pin slides in the slot 44 of rack 43.

Figure 7:
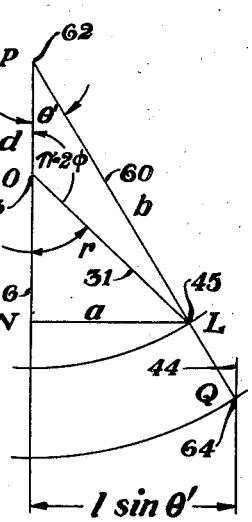
Figure 7 is a diagrammatic representation of the geometry involved in the embodiment of Figure 6.

The geometry of this arrangement can be better understood from Figure 7. Letting d represent the distance OP of the point 62 above the suspension 23, r the length OL of the follower arm 31, b the length of arm 60 included between pivot point 62 and lamp-arm pin 45, a the distance NL representing the perpendicular distance between support 26 and pin 45, then $$\sin \theta' = \frac{a}{b} \quad (11)$$

But $$a = r \sin 2\phi \quad (12)$$

and by the cosine law $$b^2 = r^2 + d^2 - 2rd \cos(\pi - 2\phi) \quad (13)$$

This reduces to $$b^2 = r^2 + d^2 + 2rd \cos 2\phi$$

or $$\frac{b^2}{r^2} = 1 + \left(\frac{d}{r}\right)^2 + 2\frac{d}{r} \cos 2\phi$$

so that $$b = r\sqrt{1 + \left(\frac{d}{r}\right)^2 + 2\frac{d}{r} \cos 2\phi} \quad (14)$$

Therefore, $$\sin \theta' = \frac{\sin 2\phi}{\sqrt{1 + \left(\frac{d}{r}\right)^2 + 2\frac{d}{r} \cos 2\phi}} \quad (15)$$

Letting 1 represent the length PQ of auxiliary arm 60, it is apparent that the effect of the cooperation between pin 64 and slot 44 is to rotate arm 60 through the angle φ' when rack 43 moves a distance 1 sin θ'. It then remains to be ascertained whether 1 sin θ' and the desired sin θ can be made proportional, where θ is expressed by Equation 2:

$$\theta = \phi + \sin^{-1} \frac{T}{WL} \phi$$

Figure 8:
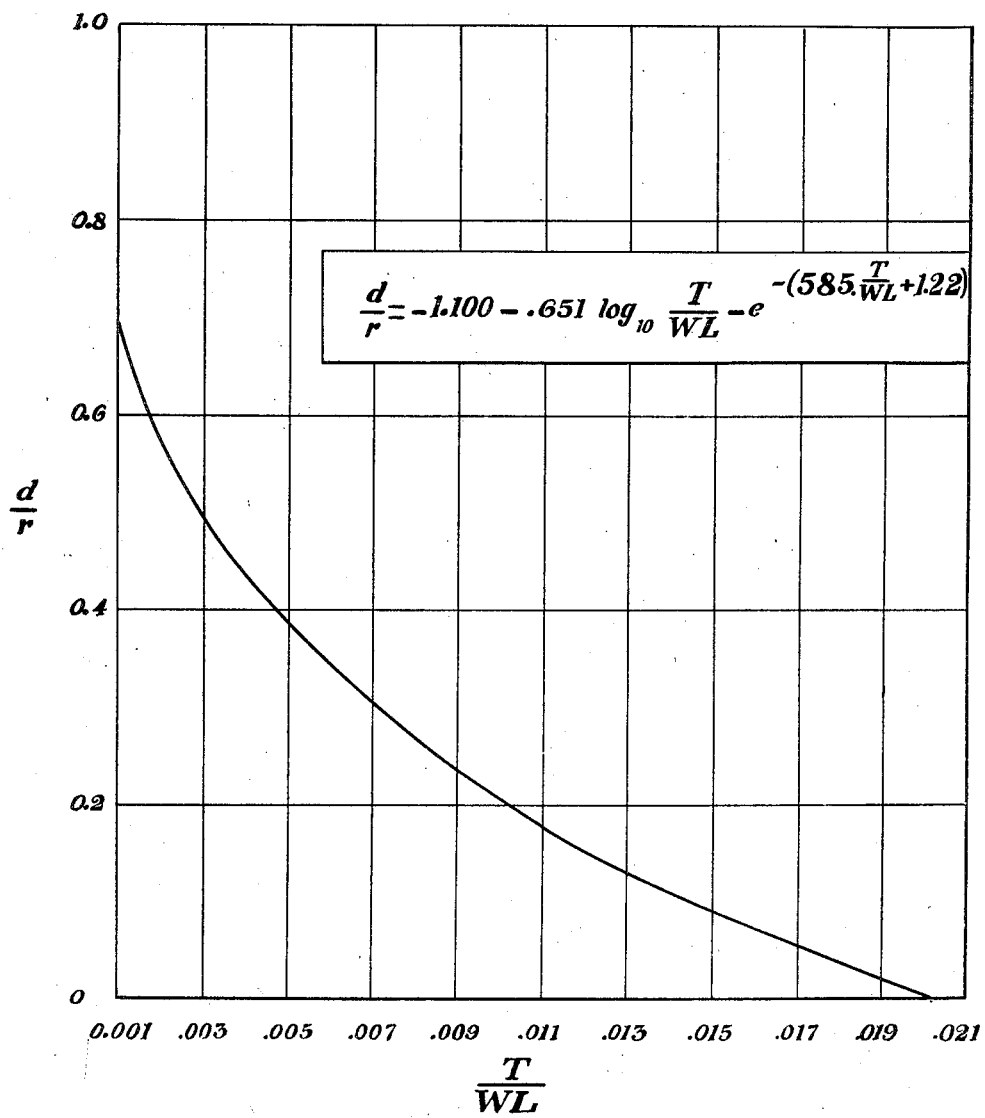
Figure 8 is a graph representing the relationship of certain variables in the embodiment of Figure 6.

As the relation between θ and φ thus depends on T/WL, the value of d/r for substitution in Equation 15 to make θ' depend in a similar way on φ also depends on T/WL. For a range of values of T/WL from .001 to .021 we have determined empirically that d/r varies approximately according to the curve plotted in Figure 8. This range of values for T/WL includes all that are likely to be encountered in practice. Below .001 the suspension fibers are too weak mechanically to make a rugged system, while above .021 they become undesirably stiff. In this range of T/WL the illustrated relation between d/r and T/WL can be represented also by the empirical equation $$\frac{d}{r} = -1.100 - .651 \log_{10} \frac{T}{WL} - e^{-\left(585\frac{T}{WL} + 1.22\right)} \quad (16)$$

For any given system T/WL is a constant which can be determined simply by rewriting Equation 1 as $$\frac{T}{WL} = \frac{\sin(\theta - \phi)}{\phi} \quad (17)$$

θ and φ being in degrees. That is, T/WL can be determined simply by ascertaining for one angle of instrument tilt θ the corresponding angle of pendulum rotation φ, the values of these angles being substituted in Equation 17. Having thus ascertained T/WL, the proper value of d/r to provide a suitable correction by this system may be read off the curve of Figure 8 or calculated from Equation 16. Construction of the elevation-meter mechanism with the pivot point 62 of the auxiliary arm 60 spaced from the pivot pin 23 by the distance d thus determined, automatically makes 1 sin θ' proportional to the desired sin θ over a wide range of angles. This is clearly demonstrated in the example which follows utilizing the elevation meter suspension formerly described in connection with the embodiment of Figures 4 and 5 when the pendulum-system constant T/WL had the value .00244.

As an example of the correction provided by this linkage-mechanism embodiment, the error at various grade angles has been computed for the particular suspension of Equation 3, that is, where T/WL=.00244. This error, which represents the difference between K sin θ' and sin θ, K being a constant arbitrarily chosen to make sin θ and sin θ' exactly equal at a given angle, and therefore including the factor 1 along with any other factors it is desired to introduce, is plotted as curve C of Figure 12. It will be observed that, even on the right-hand expanded ordinate scale, the error is just barely visible for all angles from zero to about 18°, and it only becomes as large as 1 foot per mile when the grade angle exceeds 26°. The solid-line plot of curve C shows how this error varies for angles larger than about 20°. This latter plot is to be referred to the ordinate scale on the left of the figure.

An additional advantage of this embodiment, aside from its simplicity in that all guide surfaces are planar, is that by proper choice of length for the portion LQ of auxiliary arm 60 the over-all calibration constant of the instrument may be given any value desired. If preferred, the length of portion PQ could be made adjustable to assist in making the readings of indicator 52 correspond exactly to any desired units of elevation measurement.

Figure 9:
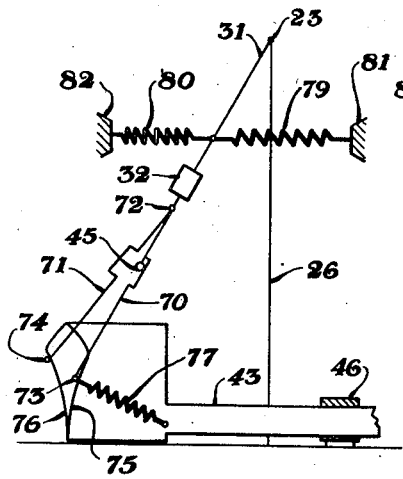
Figures 9 and 10 are diagrammatic representations of a third embodiment of our invention in two different positions.
Figure 10:
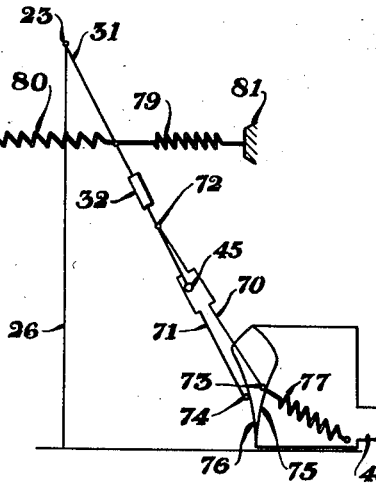
Figure 11:
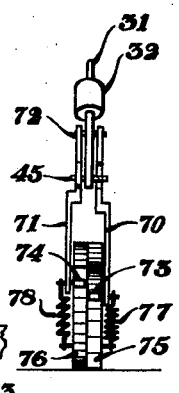
Figure 11 is an end-elevation view of this embodiment in the position shown in Figure 9.

An alternative embodiment of a variable linkage mechanism between the follower arm 31 and the rack 43 is illustrated in Figures 9, 10, and 11. Instead of connecting follower arm 31 and rack 43 by means of slot 44 and pin 45, these two members are coupled in this embodiment by interposed curved or cam surfaces which change the relationship of the rack and the follower-arm motions so that the rack displacement is no longer proportional to the sine of the follower-arm angle alone but is proportional to the sine of the angle plus a small increment which increases as a function of the grade angle. As different cams are necessary for positive and negative angles of grade, means are provided for making the follower-arm motion follow the proper cam. Thus, as is shown in Figures 9 and 11, follower arm 31 is provided with a pair of extension arms 70 and 71 pivoted to it at the point 72. Opposite sides of the arms 70 and 71, respectively, are adapted to bear against the horizontal pin 45 on the end of follower arm 31. Extension arms 70 and 71 are provided with the rollers 73 and 74, which bear against the curved cam surfaces 75 and 76, respectively. These cam surfaces form the end of the rack bar 43, the rollers being held in contact with the surfaces by the tension springs 77 and 78. A pair of tension springs 79 and 80 are connected to arm 31 at a suitable point, such as between pivot 72 and axis of rotation 23, the other ends of these springs being fixed to points 81 and 82 on the frame of the instrument. Springs 79 and 80 are preferably so arranged as to exert approximately equal and opposite forces on arm 31 when the latter is in its zero-grade-angle position. However, when arm 31 moves to one side or the other away from the zero-angle position, the increase of tension in one of springs 79 and 80 and the decrease in the other tend to oppose this motion. Therefore, when rack 43 moves to the left as in Figure 9, pin 45 will be held against arm 70 and the motion of follower arm 31 will then be determined by roller 73 bearing against cam 75. However, when rack 43 moves to the right as in Figure 10, this situation is reversed, pin 45 being held by spring 80 against arm 71 so that the motion imparted to follower arm 31 therefore corresponds to roller 74 moving along cam surface 76. Hence, it will be seen that the arm 31 assumes the smaller of the two limiting angular positions it is possible to assume by virtue of this linkage. Therefore, rack 43 must move farther to the left or the right than it would move if the cam surfaces were flat, corresponding to slot 44, in order to maintain the light beam focused on the fixed photocell unit. This is the proper motion needed to provide the desired correction. The shape of cams 75 and 76 will vary depending on the particular amount and type of correction needed by a given pendulum suspension. As any and all corrections required can be included in designing these cams, for all practical purposes the total correction provided will be exact for all angles within the range to be covered.

While this invention has been described in terms of the foregoing specific embodiments, it is apparent that numerous modifications thereof will occur to those skilled in the art. The scope of the invention, therefore, should not be considered as limited to the described details but is best defined by the following claims.

We claim:

1. In surveying apparatus including, in combination, a gravity-responsive pendulum, a support for said pendulum adapted for transportation along a traverse and for orientation according to the grade angles encountered, torsion means suspending said pendulum from said support and exerting on said pendulum a torque such that the pendulum angle relative to said support is less than the corresponding grade angle, a rotatable follower arm pivoted in said support concentrically with but independent of said pendulum, an integrator adjusting member displaceable linearly perpendicular to the follower arm direction for zero grade angle, and means controlled according to said pendulum angle for actuating said member and rotating said follower arm through twice said pendulum angle, the improvement comprising a variable coupling between said member and said follower arm, which coupling comprises a lever pivoting about a point spaced from the axis of rotation of said pendulum, said lever being coupled to said displaceable member and slidably coupled to said follower arm, the spacing of said pivoting point being so related to the length of said follower arm as to make the displacements of said member proportional to the sine of the grade angle throughout a substantial range.

2. Apparatus according to claim 1 in which said lever pivots slidably about said spaced point, and the coupling to said member coincides with the slidable coupling to said follower arm at the zero grade angle position.

3. In surveying apparatus including, in combination, a gravity-responsive pendulum, a support for said pendulum adapted for transportation along a traverse and for orientation according to the grade angles encountered, torsion means suspending said pendulum from said support and exerting on said pendulum a torque such that the pendulum angle relative to said support is less than the corresponding grade angle, a rotatable follower arm pivoted in said support concentrically with but independent of said pendulum, an integrator-adjusting member displaceable linearly perpendicular to the follower-er arm direction for zero grade angle, and means controlled according to said pendulum angle for actuating said member and rotating said follower arm through twice said pendulum angle, the improvement comprising a variable coupling between said member and said follower arm, said coupling comprising a lever pivoting about a point spaced from the axis of rotation of said pendulum and being slidably coupled to said member by a slot transverse to said member whereby the displacements of said member are proportional to the sine of the angle of rotation of said lever about said spaced point.

4. In surveying apparatus including, in combination, a gravity-responsive pendulum of effective weight W and length L, a support for said pendulum adapted for transportation along a traverse and for orientation according to the grade angles $\theta$ encountered, torsion means suspending said pendulum from said support and exerting on said pendulum a torque T per degree of rotation such that the pendulum angle $\phi$ relative to said support is less than the corresponding grade angle $\theta$, said angles being related according to the equation $$\theta = \phi + \sin^{-1} \frac{T}{WL}\phi$$

a rotatable follower arm of effective length R pivoted in said support concentrically with but independent of said pendulum, an integrator-adjusting member displaceable linearly perpendicular to the follower arm direction for zero grade angle, and means controlled according to the pendulum angle $\phi$ for actuating said member and rotating said follower arm through the angle $2\phi$; the improvement comprising an auxiliary arm pivoting slidably about a point spaced at a distance D from the axis of rotation of said pendulum in a direction opposite to the follower arm direction at zero grade angle, said auxiliary arm being slidably coupled to said follower arm and pivotally coupled to said member, the pivotal coupling to said member coinciding with the slidable coupling to said follower arm at zero grade angle, and the ratio D/R being determined utilizing the equation $$\sin \theta' = \frac{1}{n} \frac{\sin 2\phi (1 + D/R)}{\cos 2\phi + D/R}$$

by substituting therein two values of $\phi$ in the range of angles to be measured, employing the relation between $\theta$ and $\phi$ to determine $\sin \theta$ and assuming $\sin \theta' = \sin \theta$, to obtain two simultaneous equations with $n$ and D/R as variables, and solving said equations for D/R.

5. In surveying apparatus including, in combination, a gravity-responsive pendulum of effective weight W and length L, a support for said pendulum adapted for transportation along a traverse and for orientation according to the grade angles $\theta$ encountered, torsion means suspending said pendulum from said support and exerting on said pendulum a torque T per degree of rotation such that the pendulum angle $\phi$ relative to said support is less than the corresponding grade angle $\theta$, said angles being related according to the equation $$\theta = \phi + \sin^{-1} \frac{T}{WL}\phi$$

a rotatable follower arm of effective length $r$ pivoted in said support concentrically with but independent of said pendulum, an integrator-adjusting member displaceable linearly perpendicular to the follower arm direction for zero grade angle, and means controlled according to the pendulum angle $\phi$ for actuating said member and rotating said follower arm through the angle $2\phi$; the improvement comprising an auxiliary arm connected slidably to said follower arm and to said member and pivoting about a point at a distance $d$ from the axis of rotation of said pendulum in a direction opposite to the follower arm direction at zero grade angle, the relation between $d$ and the other parameters of the pendulum system being expressible as $$d/r = -1.100 - .651 \log_{10} \frac{T}{WL} - e^{-\left(585 \cdot \frac{T}{WL} + 1.22\right)}$$

the slidable coupling to said member being adapted to produce a displacement thereof proportional to the sine of the auxiliary arm rotation angle.

DANIEL SILVERMAN.
JOSEPH D. EISLER.
JULIAN F. EVANS.

REFERENCES CITED

The following references are of record in the file of this patent:

UNITED STATES PATENTS

| Number | Name | Date |
|---|---|---|
| Re. 22,919 | McNatt | Sept. 23, 1947 |
| 2,362,616 | Cloud | Nov. 14, 1944 |